United States Patent [19]

Perlman et al.

[11] Patent Number: 6,069,897
[45] Date of Patent: May 30, 2000

[54] INTERFACE WITH DUAL MODE OF OPERATION

[75] Inventors: Shuki Perlman, D. N. Haela; Yifat Ben-Sahar, Mevaseret Zion, both of Israel

[73] Assignee: Compaq Computer Corporation, Houston, Tex.

[21] Appl. No.: 08/890,167

[22] Filed: Jul. 9, 1997

[51] Int. Cl.[7] .................................................. H04L 12/28
[52] U.S. Cl. ........................................ 370/420; 370/465
[58] Field of Search ..................................... 370/463, 465, 370/419, 420, 467, 469, 492

[56] References Cited

U.S. PATENT DOCUMENTS

| | | | |
|---|---|---|---|
| 5,673,254 | 9/1997 | Crayford | 370/236 |
| 5,734,675 | 3/1998 | Leonowich | 370/274 |
| 5,751,764 | 5/1998 | Meyer et al. | 370/380 |
| 5,784,559 | 7/1998 | Frazier | 370/236 |
| 5,907,533 | 5/1999 | Kelly et al. | 370/433 |
| 5,933,427 | 8/1999 | Liang | 370/359 |
| 5,970,066 | 10/1999 | Lowry et al. | 370/353 |
| 5,995,514 | 11/1999 | Lo | 370/463 |

*Primary Examiner*—Chau Nguyen
*Assistant Examiner*—Frederic D. Wolkow
*Attorney, Agent, or Firm*—Cesari and McKenna, LLP

[57] ABSTRACT

A simple and inexpensive integrated way for connecting a variety of standard computer devices, including networking integrated circuit devices, to other standard and customized integrated circuit devices, is provided as follows. An integrated circuit device has an interface, the interface is capable of transferring data from a MAC layer to a PHY layer, and also is capable of transferring data from the PHY layer to the MAC layer. There is a pin on the integrated circuit device for setting the interface in a first mode or a second mode, and when the interface is in the first mode the interface is capable of transferring signals between a MAC device and a PHY device, and when the interface is in the second mode the interface is capable of transferring signals between a first MAC device and a second MAC device. Also, there is a set of I/O lines for connecting a standard integrated circuit device having a MAC device to the inventive integrated circuit device operating in the second mode, the interface transferring signals between the MAC device in the standard integrated circuit and a second MAC device in the inventive integrated circuit.

18 Claims, 15 Drawing Sheets

INTERFACE WITH DUAL MODE OF OPERATION

FIELD OF THE INVENTION

This invention relates to connection of computer or networking devices using standardized interfaces, and more particularly to use of a standardized interface, defined for connection of a computer device to a network, for interconnecting computer devices or networking devices.

BACKGROUND OF THE INVENTION

In designing data networking systems, the networking semiconductor devices often implement a standard set of interfaces in order to establish and simplify the connections between them. The Open System Interconnect (OSI) Reference Model is often the basis for the standard set of interfaces. More detailed standard interfaces are defined in various standards, such as the IEEE 802.2 and IEEE 802.3 set of Standard Service Specifications, including the IEEE 802.3u Standard, all disclosures of which IEEE network standards are incorporated herein by reference.

Computer devices and networking devices must be interconnected to make a computer system. For example, in a network device such as a switching hub, it is necessary to connect input/output semiconductor devices to a switching core. Also, it is often necessary to connect the input/output semiconductor devices to a system bus for transmission of management information between the input/output semiconductor device, networking semiconductor devices, and other components of the computer system.

Switching core semiconductor devices are often designed with their output stage having a Medium Access Control (MAC) device having a Medium Independent Interface (MII interface). The MAC device and the MII interface are specified in the IEEE 802.3 set of standards.

Additionally, a computer may use any of several well known standard computer system buses, such as the ISA bus, the EISA bus (Extended ISA bus), the PCI bus (Peripheral Component Interconnect bus), the Futurebus, the Futurebus+, the SCSI (Small Computer Systems Interface bus), etc. Direct connection to the buses is made by bus driver hardware. Bus driver hardware must then be designed to interface to the other specialized components of the computer system. Often, system bus driver hardware is designed so that a first side of the driver hardware connects to the system bus, while the driver hardware is addressed through a MII interface to a MAC device on the computer system side of the driver hardware.

However, to connect between a semiconductor device such as a switching core which employs a MAC device in its input/output stage and another semiconductor device which also has a MAC device as its input/output stage, it is necessary to design special purpose semiconductor devices in order to connect the two MAC devices. These special purpose semiconductor devices are sometimes referred to as "glue logic".

There is needed a simple, inexpensive means for interconnecting a variety of standard semiconductor devices in the construction of computer and networking systems.

SUMMARY OF THE INVENTION

A simple and inexpensive means for connecting a variety of standard semiconductor devices to other standard and customized semiconductor devices is provided, as follows. A digital semiconductor device has an interface, the interface is capable of transferring data from a MAC layer to a PHY layer, and also is capable of transferring data from the PHY layer to the MAC layer. There is a means for setting the interface in a first mode or a second mode, and when the interface is in the first mode the interface is capable of transferring signals between the MAC device and the PHY device, and when the interface is in the second mode the interface is capable of transferring signals between a first MAC device and a second MAC device. Also, there is a means for connecting a semiconductor device having a MAC device to the digital semiconductor device operating in the second mode, the interface transferring signals between the MAC device in the semiconductor device and a second MAC device in the digital semiconductor device.

Other and further aspects of the present invention will become apparent during the course of the following description and by reference to the accompanying drawings.

Referring now to the drawings, in which like numerals represent like parts in the several views:

DETAILED DESCRIPTION

A note on language used in this description of the invention follows. A "computer chip" or a "computer device" is meant to include any device used in a computer system, including devices used in connecting a computer to a network, or devices used in a networking apparatus such as a hub, a switching hub, a router, a switching router, or any other computer or networking apparatus. A "networking device" is meant to include any computer chip or computer device as defined above. A "computer chip" or a "computer device" or a "networking device" is often fabricated as a semiconductor device such as an integrated circuit, and the integrated circuit is often fabricated as an application specific integrated circuit, often abbreviated as an "ASIC".

The integrated circuit is often referred to as a digital semiconductor device, or as a digital integrated circuit. The terms: computer chip; or a computer device; or a networking device; or a semiconductor device; or an integrated circuit; or a digital semiconductor device; or a digital integrated circuit, are used herein interchangeably, and no distinction is intended in the use of one term or another term throughout the following discussion. The inventive dual mode interface may be conveniently installed in any of the mentioned: computer chip; or a computer device; or a networking device; or a semiconductor device; or an integrated circuit; or an application specific integrated circuit, ASIC; or a digital semiconductor device; or a digital integrated circuit, etc.

Figure 1:
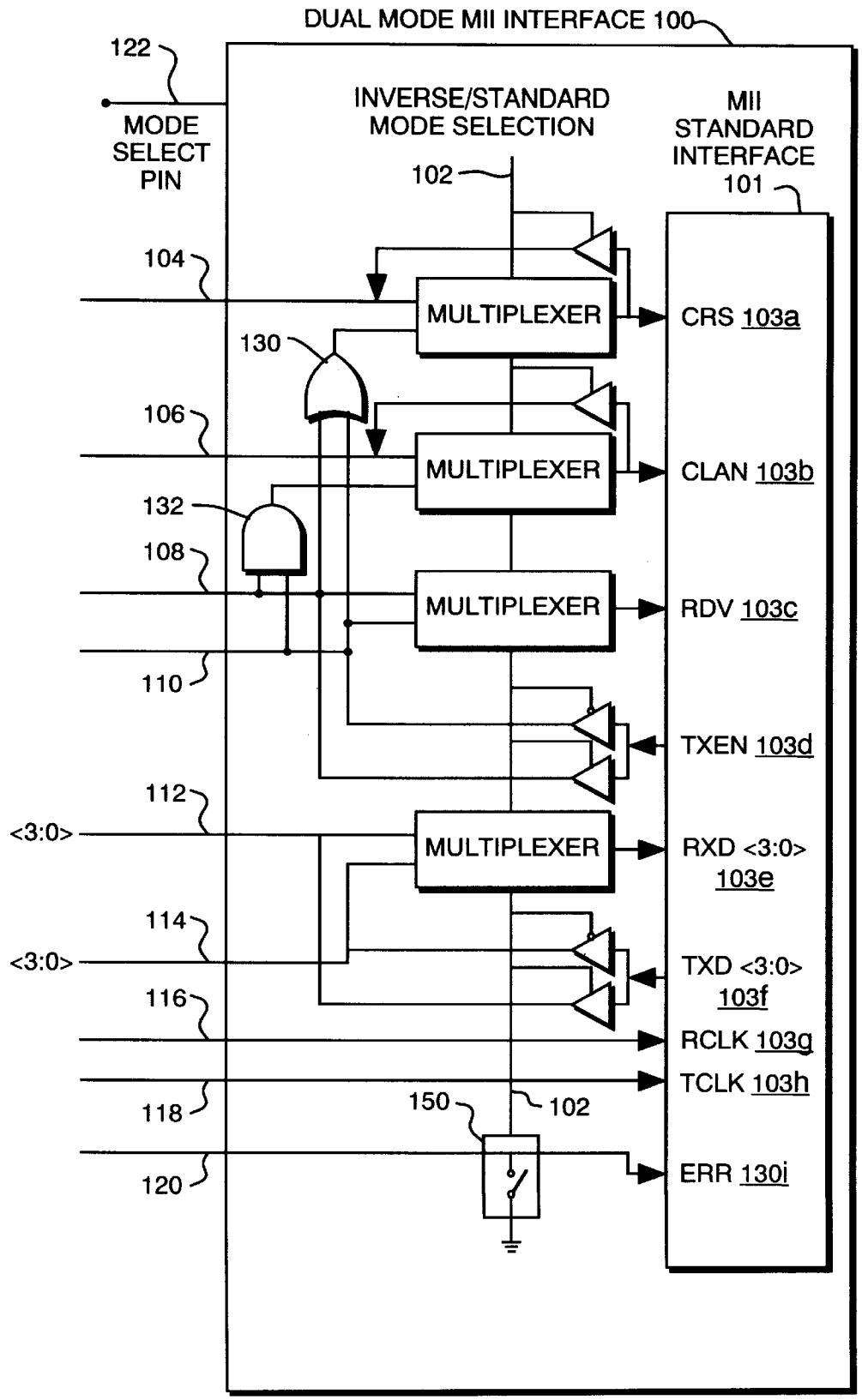
FIG. 1 is a block diagram of a dual mode interface with mode selection logic.

Turning now to FIG. 1, semiconductor device 100 uses a standard MII interface 101. A semiconductor device such as semiconductor device 100 is often conveniently referred to as a "computer chip or a network chip". Signals used by the MII interface 101, and as defined by the IEEE 802.3u standard (signal names are modified for convenience), comprise:

CRS: is the carrier sense signal. CRS shall be asserted by the PHY sublayer when either the transmit or receive medium is nonidle.

CLAN: is the collision signal (COL in IEEE 802.3u). CLAN shall be asserted by the PHY sublayer upon detection of a collision on the medium, and shall remain asserted while the collision persists. COL is not required to transition synchronously with respect to either the TCLK or the RCLK clock signals.

RDV: is the Receive Data Valid signal. The RDV signal is driven by the PHY sublayer to indicate that the PHY sublayer is presenting recovered and decoded nibbles on the RXD<3:0> bundle and that the data on the RXD<3:0> bundle is synchronous to RCLK clock signal. RDV transitions synchronously with respect to the RCLK clock signal. RDV shall remain asserted continuously from the first recovered nibble of the frame through the final recovered nibble and shall be negative prior to the first RCLK clock signal that follows the final nibble. In order for a received frame to be correctly interpreted by the Reconciliation sublayer and the MAC sublayer, RDV must encompass the frame, starting no later than the Start Frame Delimiter (SFD) and excluding any end-of-frame delimiter.

TXEN: is the transmit enable signal. TXEN indicates that the Reconciliation sublayer is presenting nibbles on the MII for transmission. It shall be asserted by the Reconciliation sublayer synchronously with the first nibble of the preamble and shall remain asserted while all nibbles to be transmitted are presented to the MII. TXEN shall be negated prior to the first TCLK clock signal following the final nibble of a frame. TXEN is driven by the Reconciliation sublayer and shall transition synchronously with respect to the TCLK clock signal.

RXD<3:0>: is a bundle of four (4) data signals for receiving nibbles of data by the MII interface from the PHY sublayer. The four data signals transition synchronously with respect to the RCLK clock signal. RXD<3:0>bundle are driven by the PHY sublayer. For each RCLK clock signal period in which RDV is asserted, RXD<3:0>bundle transfers four bits of recovered data from the PHY sublayer to the Reconciliation sublayer. RXD<0>is the least significant bit. While RDV is de-asserted, RXD<3:0>bundle shall have no effect on the Reconciliation sublayer. While RDV is de-asserted, the PHY sublayer may provide a False Carrier indication by asserting the ERR signal while driving the value <1110> onto RXD<3:0>bundle.

ERR: is the receive error signal. ERR shall transition synchronously with respect to the RCLK clock signal. ERR shall be asserted for one or more RCLK periods to indicate to the Reconciliation sublayer that an error (e.g. a coding error, or any error that the PHY is capable of detecting, and which otherwise would be undetectable at the MAC sublayer) was detected somewhere in the frame presently being transferred from the PHY to the Reconciliation sublayer. While RDV is de-asserted, ERR shall have no effect on the Reconciliation sublayer.

TXD<3:0>: is a bundle of four (4) data lines for transmitting nibbles of data to the PHY sublayer. The TXD<3:0>signals are driven by the Reconciliation sublayer.

TXD<3:0>shall transition synchronously with respect to the TCLK clock signal. For each TCLK clock signal period in which TXEN is asserted, TXD<3:0>are accepted for transmission by the PHY sublayer. TXD<0>is the least significant bit. While TXEN is de-asserted, TXD<3:0>shall have no effect upon the PHY sublayer.

RCLK: is the receive clock signal. RCLK clock signal is a continuous clock that provides the timing reference for the transfer of RDV, RXD<3:0>and ERR signals from the PHY sublayer to the Reconciliation sublayer. RCLK clock signal is sourced by the PHY sublayer. The PHY sublayer may recover the RCLK clock signal reference from the received data or it may derive the RCLK clock signal reference from a nominal clock (e.g., the TCLK clock signal reference). While RDV is asserted, RCLK clock signal shall be synchronous with recovered data, shall have a frequency equal to 25% of the data rate of the received signal, and shall have a duty cycle of between 35% and 65% inclusive. When the signal received from the medium is continuous and the PHY sublayer can recover the RCLK clock signal reference and supply the RCLK clock signal on a continuous basis, there is no need to transition between the recovered clock reference and a nominal clock reference on a frame-by-frame basis. If loss of received signal from the medium causes a PHY sublayer to lose the recovered RCLK clock signal reference, the PHY sublayer shall source the RCLK clock signal from a nominal clock reference.

TCLK: is the transmit clock signal. TCLK clock signal is a continuous clock that provides the timing reference for the transfer of the TXEN, TXD<3:0>, and TX_ER signals from the Reconciliation sublayer to the PHY sublayer. TCLK clock signal is sourced by the PHY sublayer. The TCLK clock signal frequency shall be 25% of the nominal transmit data rate +−100 ppm. For example, a PHY sublayer operating at 100 Mb/s must provide a TCLK clock signal frequency of 25 MHZ, and a PHY sublayer operating at 10 Mb/s must provide a TCLK clock signal frequency of 2.5 MHZ. The duty cycle of the TCLK clock signal shall be between 35% and 65% inclusive.

TX_ER: is the transmit coding error signal. TX_ER shall transition synchronously with respect to the TCLK clock signal transmit clock signal. When TX_ER is asserted for one or more TCLK clock signal periods while TXEN is also asserted, the PHY sublayer shall emit one or more symbols that are not part of the valid data or delimiter set somewhere in the frame being transmitted. The relative position of the error within the frame need not be preserved. Assertion of the TX_ER signal shall not affect the transmission of data when a PHY sublayer is operating at 10 MB/s or when TXEN is de-asserted. The TX_ER signal shall be implemented at the MII of a PHY sublayer, may be implemented at the MII of a repeater that provides an MII port, and may be implemented in MAC sublayer devices. If a Reconciliation sublayer or a repeater with an MII port does not actively drive the TX_ER signal, it shall ensure that the TX_ER signal is pulled down to an inactive state at all times.

Additional logic within semiconductor device 100 is controlled by logic signal line 102. Logic signal line 102 selects whether the input/output lines 104, 106, 108, 110, 112, 114, 116, 118, 120 are operating in standard mode or inverse mode.

In standard mode of operation logic signal line 102 is maintained at a logic level to achieve the following consequences:

the CRS 103A carrier sense signal is connected to line 104;
the CLAN 103B collision signal is connected to line 106;
the RDV 103C Receive Data Valid signal is connected to line 108;
the TXEN 103D transmit enable signal is connected to line 110;
the RXD 103E bundle of four receive lines is connected to lines 112;
the TXD 103F bundle of four transmit lines is connected to lines 114;
the RCLK 103G receive clock line is connected to line 116;
the TCLK 103H transmit clock line is connected to line 118;
the ERR 103J error signal line is connected through controlled switch 150 to line 120.

In inverse mode of operation logic signal line 102 is maintained at a logic level to achieve the following inverse mode consequences:

the CRS 103A carrier sense signal is driven by OR logic circuit 130 so that CRS is asserted whenever either the RDV 103C or the TXEN 103D signals are asserted;
the CLAN 103B collision signal is driven by AND logic circuit 132 so that CLAN is asserted when both the RDV 103C and the TXEN 103D signals are asserted;
the RDV 103C Receive Data Valid signal is connected to line 110;
the TXEN 103D transmit enable signal is connected to line 108;
the RXD 103E bundle of four receive lines is connected to lines 114;
the TXD 103F bundle of four transmit lines is connected to lines 112;
the RCLK 103G receive clock line and the TCLK 103H transmit clock line are connected together externally to semiconductor device 100, and both are driven by an external clock signal;
the ERR 103J error signal line is grounded by controlled switch 150.

Mode select pin 122 selects whether interface 101 of semiconductor device 100 operates in the standard mode or operates in the inverse mode. Connection of mode select pin 122 to an external circuit is fully disclosed with reference to FIG. 3A, 3B and FIG. 4A, 4B hereinbelow. Internal to semiconductor device 100, the voltage applied to mode select pin 122 is sampled as semiconductor device 100 is initialized. In the event that the sampled voltage has a first value, then logic signal line 102 drives the logic in semiconductor device 100 to operate in the "standard mode" of operation. In the event that the sampled voltage has a second value, then logic signal line 102 drives the logic in semiconductor device 100 to operate in the "inverse mode" of operation.

Figure 2A:
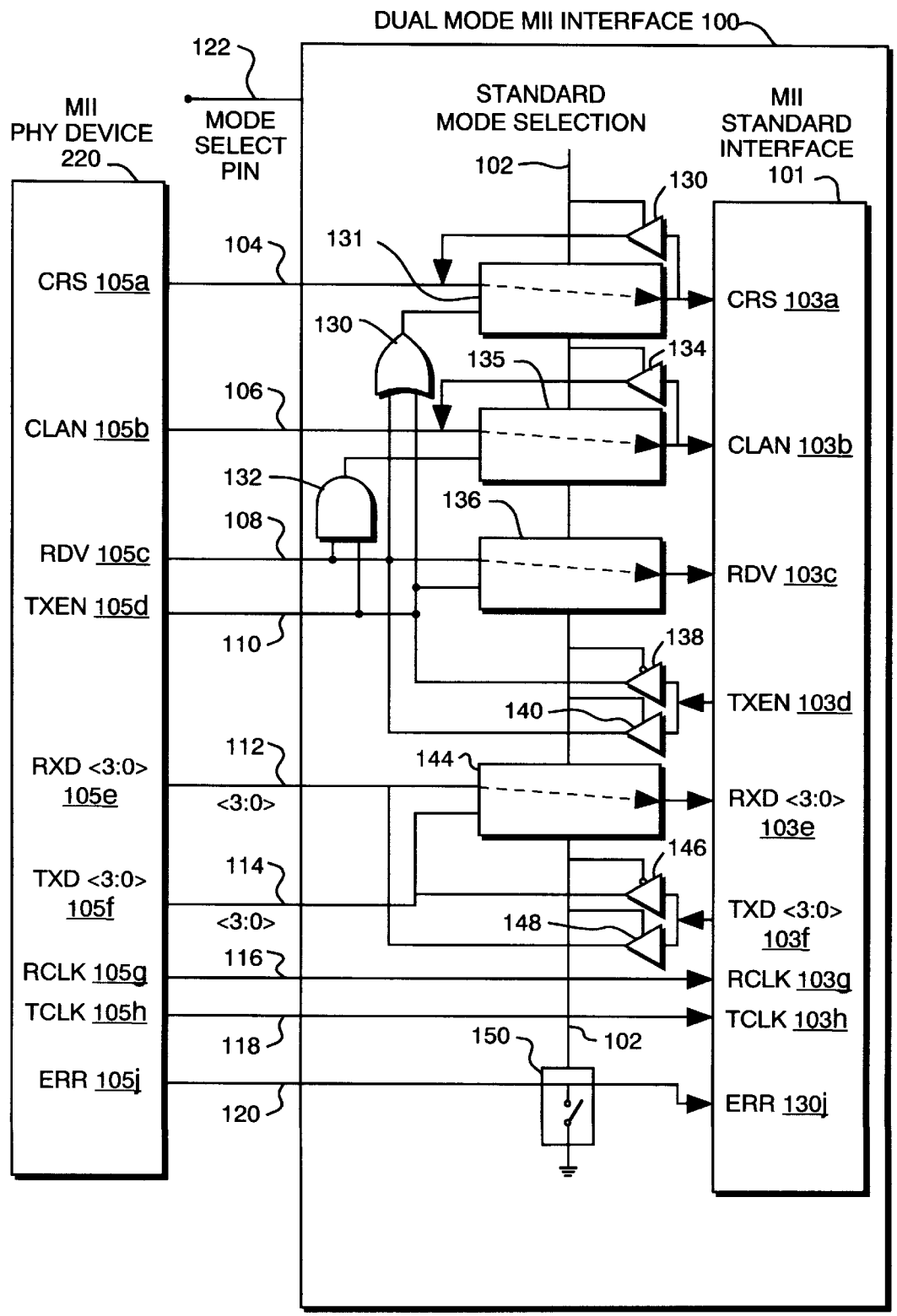
FIG. 2A is a block diagram of a dual mode interface connected in standard mode.

Turning now to FIG. 2A, details of operation of semiconductor device 100 in standard mode are shown. In standard mode of operation, semiconductor device 100 is connected to semiconductor device 220 which has implemented a PHY device having a MII interface. The PHY device is specified in the IEEE 802.3 set of standards, as shown in more detail with reference to FIG. 5 hereinbelow. The standard signals of the PHY device are shown in FIG. 2A. In standard mode of operation logic signal line 102 is maintained at a logic level to achieve the following consequences:

the CRS 103A carrier sense signal is connected to line 104 by controlled amplifier 130 being cut-off and multiplexer 131 connecting CRS 103A signal with line 104, thereby connecting to PHY device 220 signal CRS 105A;
the CLAN 103B collision signal is connected to line 106 by controlled amplifier 134 being cut-off and multiplexer 135 connecting CLAN 103C signal with line 106, thereby connecting to PHY device 220 signal CLAN 105B;
the RDV 103C Receive Data Valid signal is connected to line 108 by multiplexer 136, thereby connecting to PHY device 220 signal RDV 105C;
the TXEN 103D transmit enable signal is connected to line 110 by controlled NOT amplifier 138 being cut-on and thereby connecting the TXEN 103D signal to line 110, and by controlled amplifier 140 being cut-off, thereby connecting to PHY device 220 signal TXEN 105D;
the RXD 103E bundle of four receive lines is connected to lines 112 by multiplexer 144 connecting RXD 103E bundle of four receive lines to the bundle of four lines 112, thereby connecting to PHY device 220 signal RXD 105E bundle of four receive lines;
the TXD 103F bundle of four transmit lines is connected to lines 114 by NOT controlled amplifier 146 being cut-on, and controlled amplifier 148 being cut-off, thereby connecting to PHY device 220 signal TXD 105F bundle of four transmit lines;
the RCLK 103G receive clock line is connected to line 116, thereby connecting to PHY device 220 signal RCLK 105G;
the TCLK 103H transmit clock line is connected to line 118, thereby connecting to PHY device 220 signal TCLK 105H;
the ERR 103J error signal line is connected to line 120 through controlled switch 150 making the connection between ERR 103J signal and line 120, thereby connecting to PHY device 220 error signal ERR 105J.

The logic circuits, OR logic circuit 130 and the AND logic circuit 132, have their outputs connected to nothing, by: multiplexer 131 connects the output of OR logic circuit 130 to nothing; and multiplexer 135 connects the output of AND logic circuit 132 to nothing. Consequently OR logic circuit 130 and the AND logic circuit 132 are not used during standard mode of operation of semiconductor device 100.

Figure 2B:
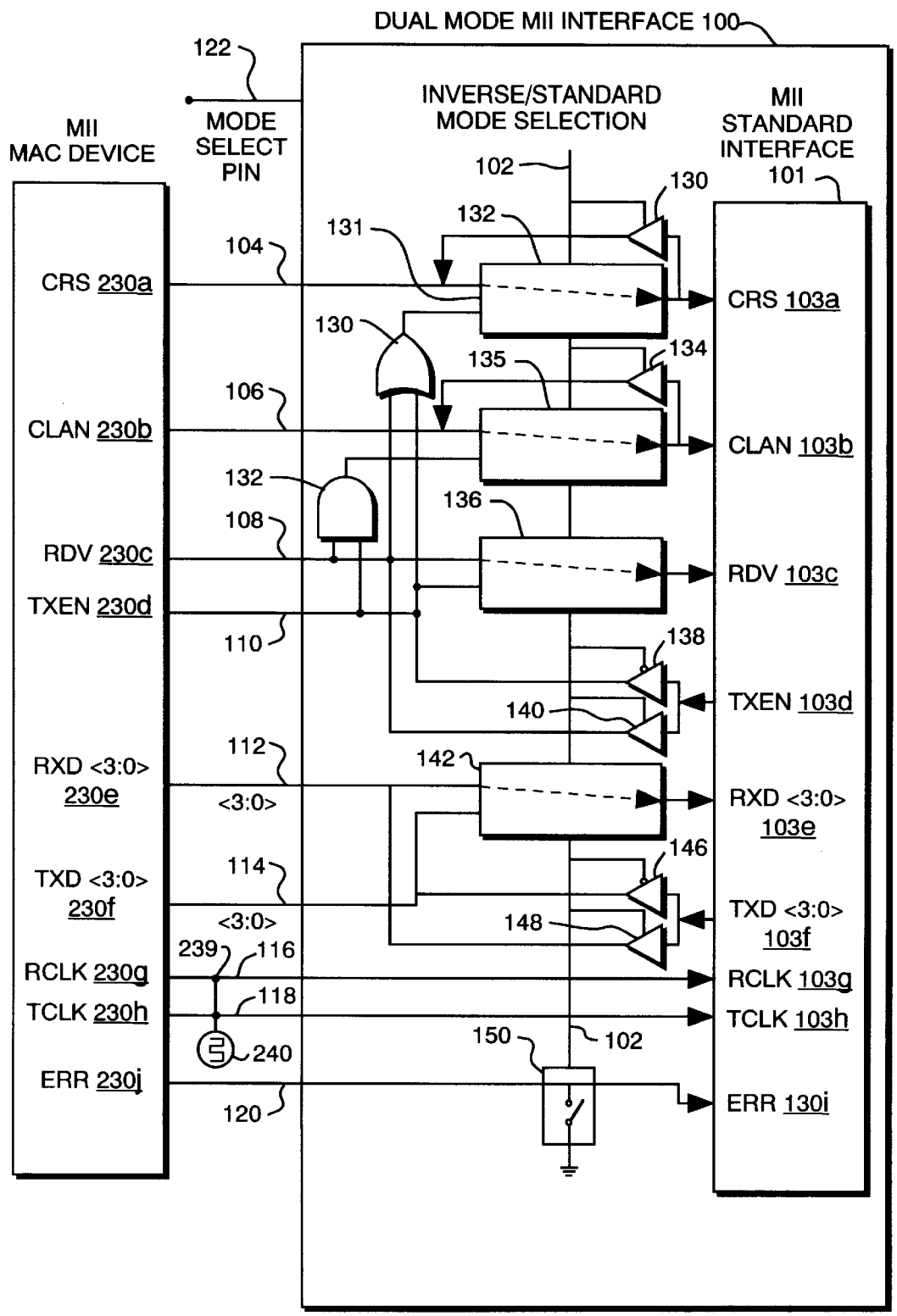
FIG. 2B is a block diagram of a dual mode interface connected in inverse mode.

Turning now to FIG. 2B, details of operation of semiconductor device 100 in inverse mode are shown. In inverse mode of operation, semiconductor device 100 is connected to semiconductor device 230 which has implemented a MAC device having a MII interface. The MAC device is specified in the IEEE 802.3 set of standards, as shown in more detail with reference to FIG. 6 hereinbelow. The standard signals of the MAC device are shown in FIG. 2B. In inverse mode of operation logic signal line 102 is maintained at a logic level to achieve the following inverse mode consequences:

the CRS 103A carrier sense signal is driven by OR logic circuit 130 through multiplexer 131 connecting the output of OR logic circuit 130 to the CRS 103A signal so that CRS is asserted whenever either the RDV 103C or the TXEN 103D signals are asserted, thereby triggering the carrier sense circuits of the standard interface 101 when semiconductor device 100 is either receiving data or transmitting data;

the CLAN 103B collision signal is driven by AND logic circuit 132 through multiplexer 135 so that CLAN is asserted when both the RDV 103C and the TXEN 103D signals are asserted, thereby triggering the collision sense circuits of standard interface 101 whenever an attempt is made to cause semiconductor device 100 to both send and receive data at the same time;

the RDV 103C Receive Data Valid signal is connected to line 110 by multiplexer 136 making a connection between line 110 and the RDV 103C signal, and by NOT controlled amplifier 138 being cut-off in order to connect the MAC TXEN 230D signal to the RDV 103C signal, thereby when MAC device 230 is transmitting with TXEN 230D enabled it asserts the RDV 103 receive data valid signal of interface 101 of semiconductor device 100;

the TXEN 103D transmit enable signal is connected to line 108 by controlled amplifier 140 being cut-on in order to connect the semiconductor device 100 TXEN 103D signal to the MAC device 230 RDV 230C signal, thereby when semiconductor device 100 is transmitting with TXEN 103D enabled it asserts the RDV 230C receive data valid signal of MAC device 230; the RXD 103E bundle of four receive lines is connected to lines 114 by multiplexer 142 making the connection, and NOT controlled amplifier 146 cut-off, and lines 114 connect to MAC 230 device TXD 230F bundle of four transmit lines, thereby when MAC device 230 transmits data on TXD 230F bundle of four transmit lines then semiconductor device 100 receives the data on its interface 101 receive bundle of four data lines RXD 103E;

the TXD 103F bundle of four transmit lines is connected to lines 112 by controlled amplifier 148 being cut-on and NOT controlled amplifier 146 being cut-off to connect the semiconductor device 100 TXD 103F bundle of four transmit lines to the MAC device 230 receive signals RXD 230E, thereby when semiconductor device 100 transmits on its bundle of four TXD 103F lines the MAC device 230 receives the data at its bundle of four receive signals RXD 230E;

the RCLK 103G receive clock line and the TCLK 103H transmit clock line are connected together externally to semiconductor device 100 at point 239, and both are driven by an external clock signal 240, thereby supplying a clock signal to both devices when either is transmitting or receiving; and, for example, clock signal 240 may conveniently operate at a standard IEEE 802.3 frequency, which includes 25 megahertz for a 100 megabit per second design, and also includes 2.5 megahertz for a 10 megabit per second design, as the frequency is specified in IEEE 802.3 as ¼ of the bit transfer rate, as the transfer is made in four bit bytes;

the ERR 103J error signal line and the MAC device ERR 230J signal line are grounded by controlled switch 150 closing.

Figure 3A:
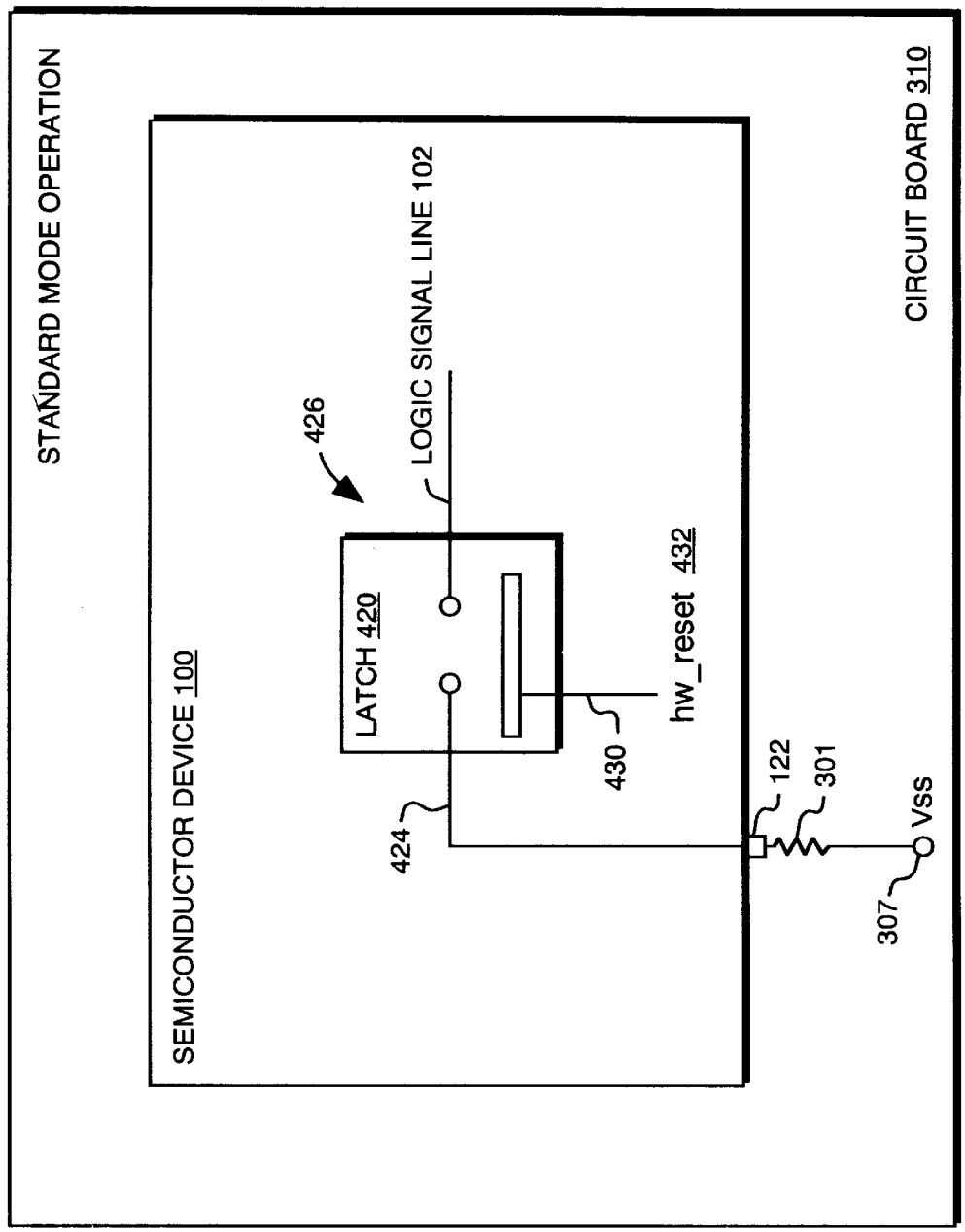
FIG. 3A is a circuit diagram of a driver circuit for a mode select pin, in a standard mode.
Figure 3B:
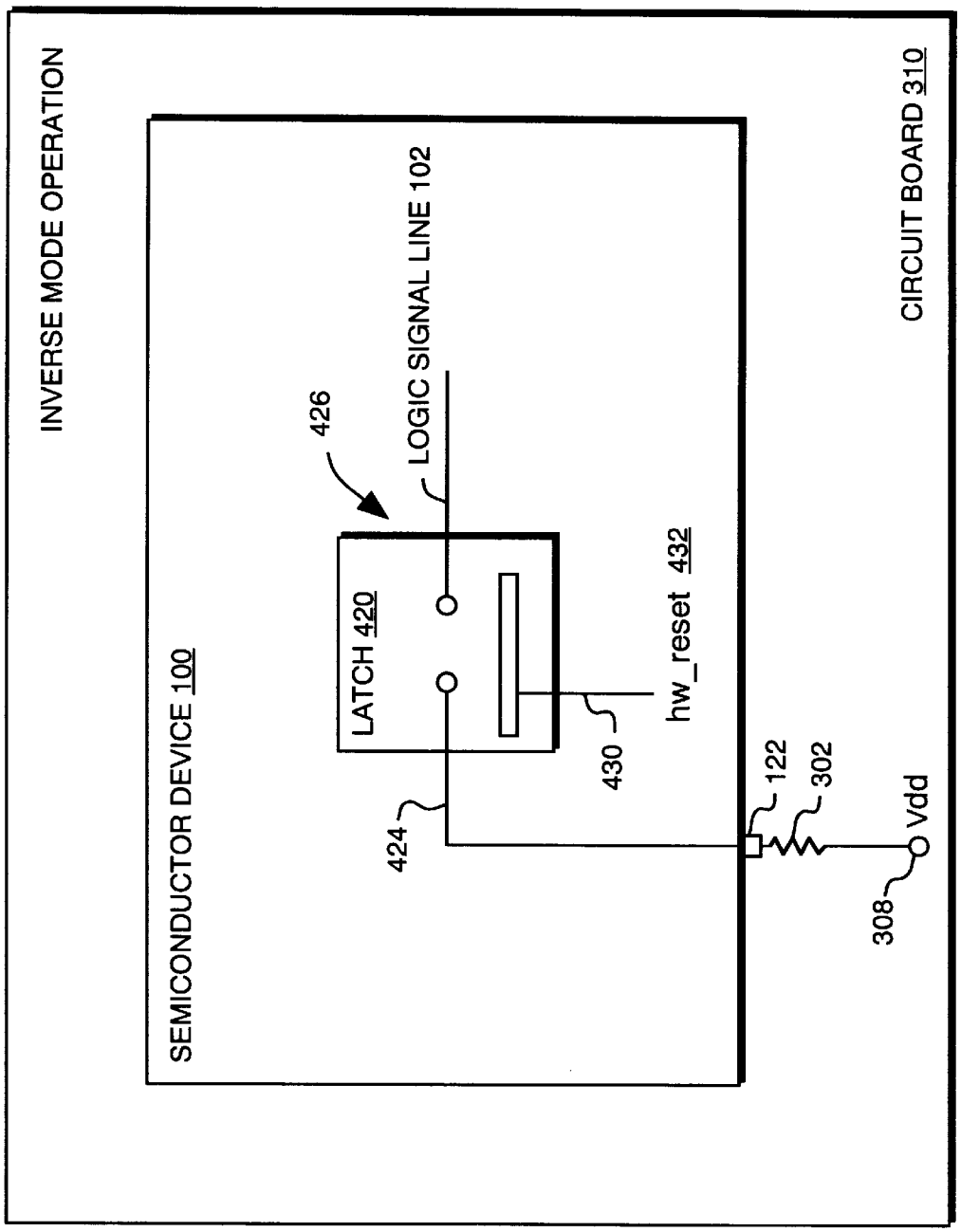
FIG. 3B is a circuit diagram of a driver circuit for a mode select pin, in an inverse mode.

Turning now to FIG. 3A and FIG. 3B, there are illustrated connections to mode select pin 122. The connections to mode select pin 122 illustrated in FIG. 3A and FIG. 3B are illustrative of a type of connection which may be used to drive a mode select pin into either of two different modes, and those skilled in the art will recognize that there are many alternative equivalent methods of connection which can be used to drive a mode select pin into either a first mode or into a second mode.

In FIG. 3A mode select pin 122 is connected to a voltage source to drive logic signal line 102 to operate the interface in standard mode of operation. Mode select pin 122 extends from semiconductor device 100. Mode select pin 122 connects to a first end of resistor 301, with the second end of resistor 301 connected to voltage Vss at point 307. Voltage Vss is, in a preferred embodiment of the invention, a ground connection. Semiconductor device 100 and resistor 301 are both mounted on circuit board 310. Also circuit board 310 provides connection of point 307 to voltage Vss.

In FIG. 3B mode select pin 122 is connected to a voltage source to drive logic signal line 102 to operate the interface in inverse mode of operation. Mode select pin 122 extends from semiconductor device 100. Mode select pin 122 connects to a first end of resistor 302, with the second end of resistor 302 connected to voltage Vdd at point 308. Voltage Vdd is, in a preferred embodiment of the invention, positive 3.5 volts. Semiconductor device 100 and resistor 302 are both mounted on circuit board 310. Also circuit board 310 provides connection of point 308 to voltage Vdd.

Figure 4A:
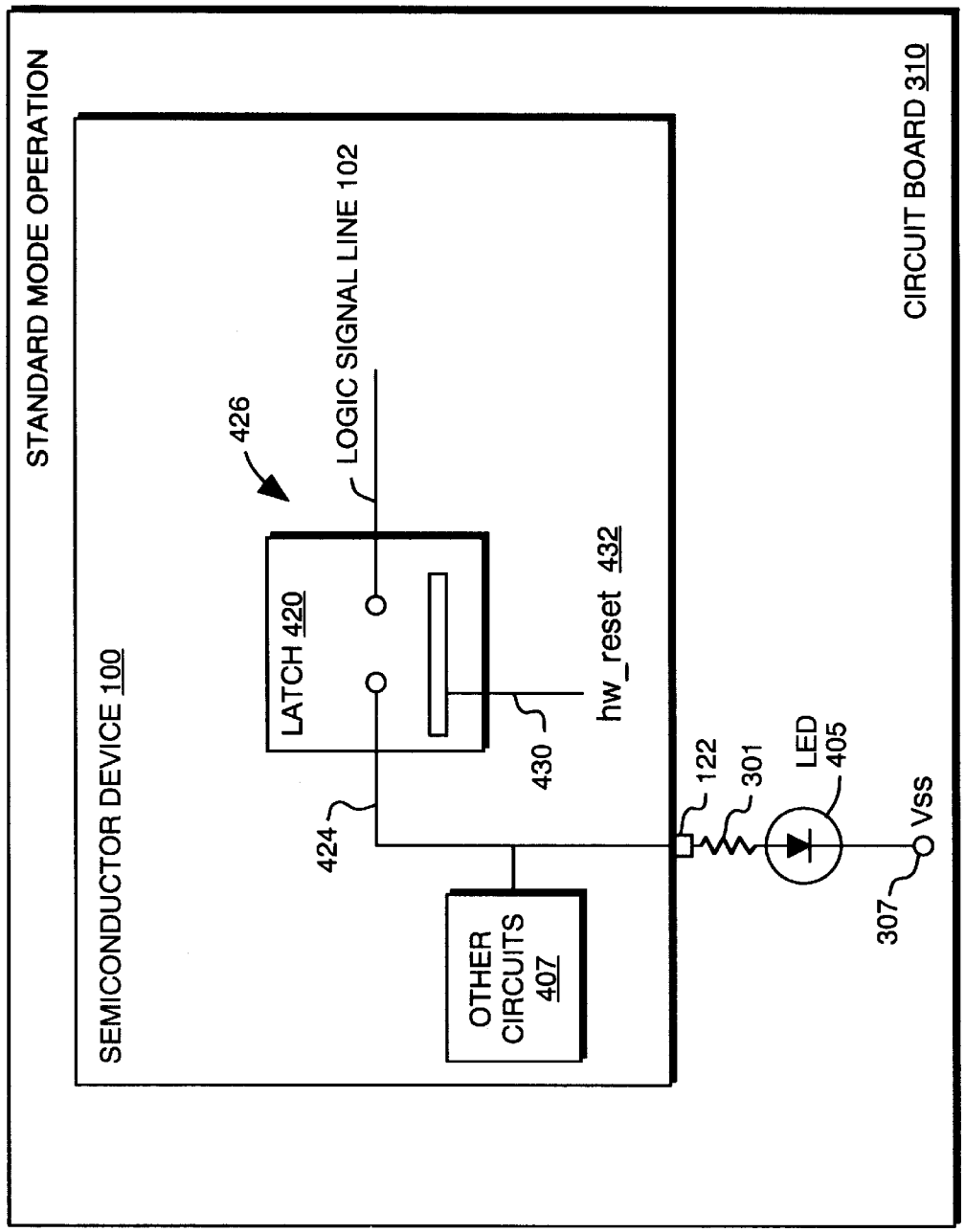
FIG. 4A is an alternative circuit diagram of a driver circuit for a mode select pin, in a standard mode.

In FIG. 4A, mode select pin 122 is used as an output pin of semiconductor device 100, as well as an input pin to control the voltage level of logic signal line 102. During execution of a reset operation of circuit board 310, mode select pin 122 serves as an input pin to semiconductor device 100 for the purpose of controlling the voltage level of logic signal line 102. During steady operation of semiconductor device 100, mode select pin 122 can, alternatively, serve as an output pin of semiconductor device 100. For example, in FIG. 4A, mode select pin 122 is used to drive light emitting diode (LED) 405. Mode select pin 122 is driven by other circuits 407, for example, to Vdd in order to illuminate LED 405, and is driven to Vss in order to extinguish LED 405.

Figure 4B:
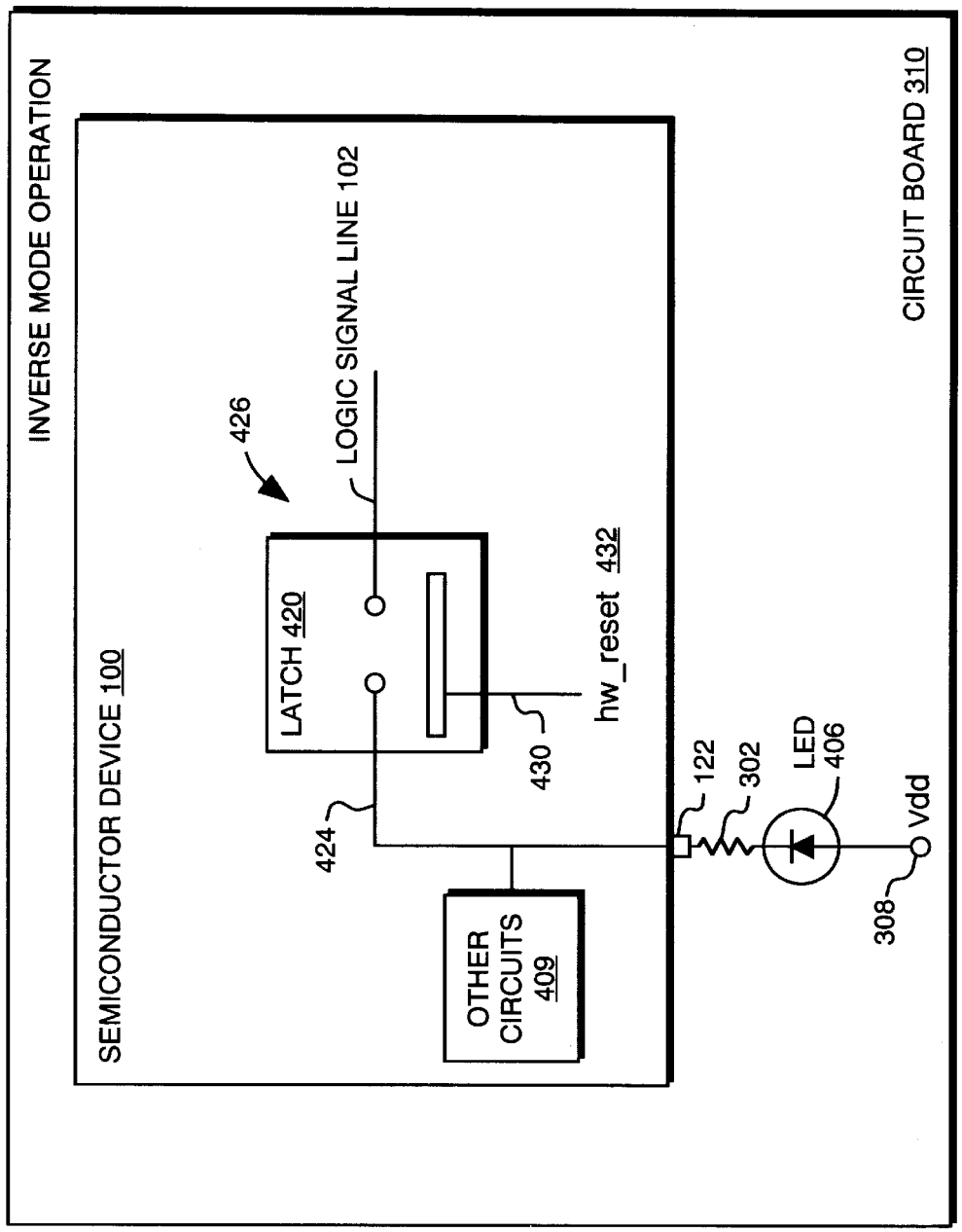
FIG. 4B is an alternative circuit diagram of a driver circuit for a mode select pin, in an inverse mode.

In FIG. 4B, mode select pin 122 is also used as an output pin of semiconductor device 100, as well as an input pin to control the voltage level of logic signal line 102. During execution of a reset operation of circuit board 310, mode select pin 122 serves as an input pin to semiconductor device 100 for the purpose of controlling the voltage level of logic signal line 102. During steady operation of semiconductor device 100, mode select pin 122 can, alternatively, serve as an output pin of semiconductor device 100. For example, in FIG. 4B, mode select pin 122 is used to drive light emitting diode (LED) 406. Mode select pin 122 is driven by other circuits 409, for example, to Vss in order to illuminate LED 405, and is driven to Vdd in order to extinguish LED 406.

As shown in FIG. 3A, and FIG. 4A, there is illustrated a circuit using a latch 420 for driving logic signal line 102 from mode select pin 122 for standard mode of operation. Mode select pin 122 is connected to voltage Vss 422 through a resistor or through a resistor and a LED.

Mode select pin 122 is connected to latch 420 input line 424. Latch 420 output line 426 connects to logic signal line 102. Latch 420 is controlled by control line 430. Control line 430 is strobed by the computer system hardware reset line hw_reset 432. During operation of hardware reset, hardware reset line 432 is strobed for a time window. The voltage appearing on latch input 424 is driven to latch output 426, and the voltage driven to latch output 426 is referred to as the "sampled voltage value". The "sampled voltage value" remains constant on latch output line 426 after the hardware reset line 432 returns to its quiescent value. For example, when Vss is ground value, then logic signal line 102 is held at a DC voltage value of substantially ground, which DC substantially ground value is used by the dual mode interface 100 to drive operation of dual mode interface 100 in standard mode. Logic signal line 102 controls both the multiplexers 131, 135, 136, and 144, and the controlled switch 150 to operate in the standard mode of operation.

Turning again to FIG. 3B and FIG. 4B, there is shown a circuit using latch 420 for driving logic signal line 102 from mode select pin 122 for inverse mode of operation. Mode select pin 122 is connected to latch 420 input line 424. Latch 420 output line 426 connects to logic signal line 102. Latch 420 is controlled by control line 430. Control line 430 is strobed by the computer system hardware reset line hw__reset 432. During operation of hardware reset, hardware reset line 432 is strobed for a time window. The voltage appearing on latch input 424 is driven to latch output 426, and the voltage driven to latch output 426 is referred to as the "sampled voltage value". The "sampled voltage value" remains constant on latch output line 426 after the hardware reset line 432 returns to its quiescent value. For example, when Vdd is positive 3.5 Volts, then logic signal line 102 is held at a DC voltage value of substantially 3.5 Volts, which DC value is used by the dual mode interface 100 to drive operation of dual mode interface 100 in inverse mode. Logic signal line 102 controls both the multiplexers 131, 135, 136, and 144, and the controlled switch 150 to operate in inverse mode of operation.

Figure 4C:
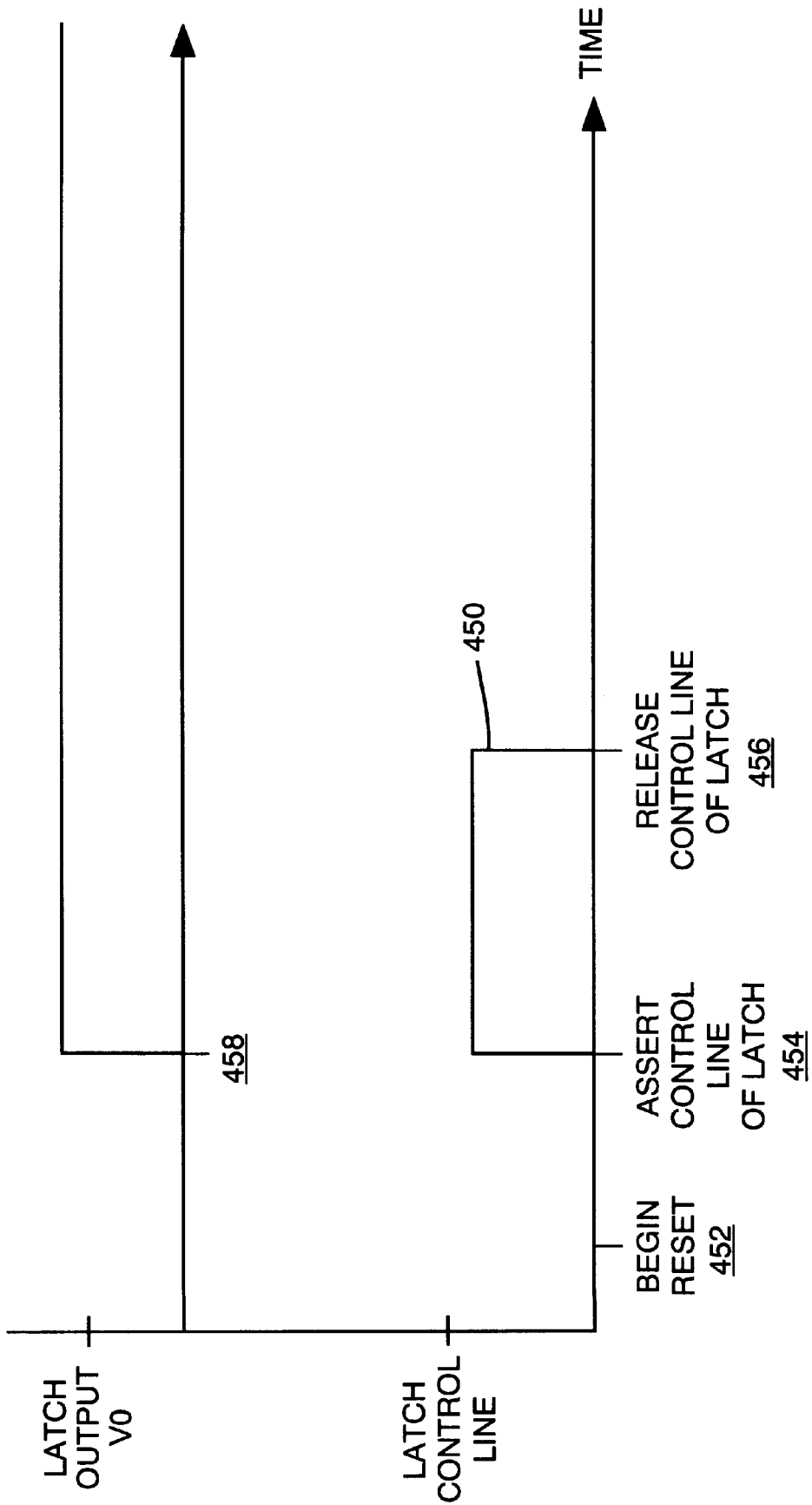
FIG. 4C is a timing diagram for operation of a mode select pin.

Turning now to FIG. 4C, there is shown a timing diagram for operation of latch 420. During a hardware reset operation of the apparatus, in particular, during a hardware reset operation of circuit board 310, the hardware reset process applies time dependent voltage 450 to hw__reset line 432. The hardware reset operation begins at time 452. Hardware reset line hw__reset line 432 is asserted at time 454. Hardware reset line hw__reset line 432 is released at time 456. The time interval between assertion time 454 and release time 456 may, conveniently, be a few milliseconds, or as long as a few seconds, and this time interval is the strobe "time window" mentioned hereinabove. At time 458, sometime between assertion time 454 and release time 456, the voltage of latch output line 426 is driven to voltage Vo, where voltage Vo is the voltage of latch input line 424 during the time interval of assertion time 454 to release time 456. After release time 456, the voltage on latch output line 426 remains at voltage Vo. The voltage on latch output line 426 will remain at the value of Vo until power is removed from semiconductor device 100. Accordingly, after release time 456, other circuits 407 or other circuits 409 may drive mode select pin 122 to any voltage, for mode select pin 122 to serve as an output pin of semiconductor device 100. Using latch 420 to sample the voltage on mode select pin 122 during hardware reset, during the time window 454 to 456, frees a pin of semiconductor device 100 for a second use during normal operation of semiconductor device 100. This double use of mode select pin 122 is very helpful when "pin count" limits the number of signals which can be brought to a semiconductor device.

Figure 5:
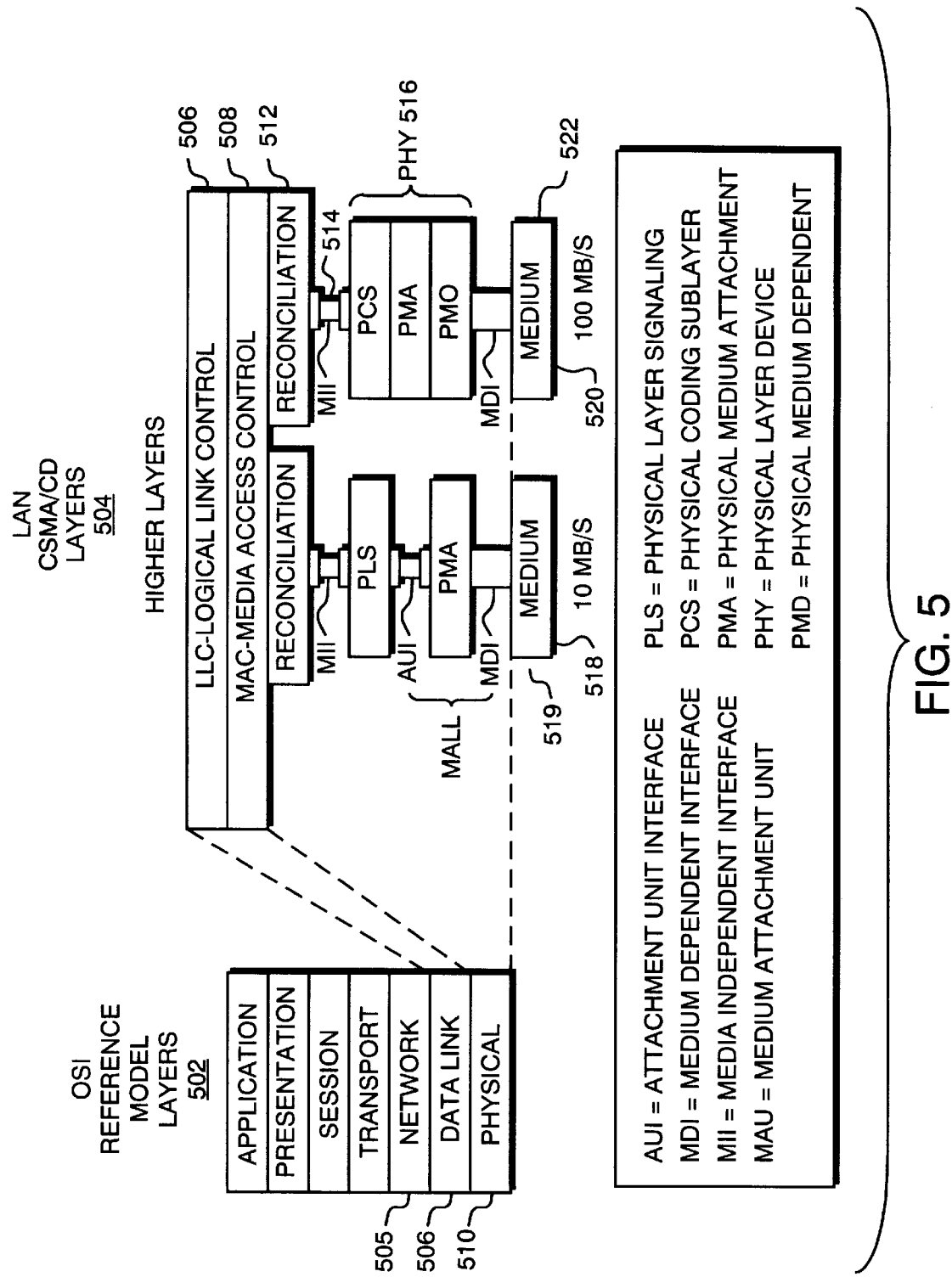
FIG. 5 is a block diagram of the IEEE 802.3 Standard Service Specifications, and the OSI Reference Model for communications.

Turning now to FIG. 5, there is illustrated a comparison of the Open Systems Interconnection (OSI) Reference Model 502 for computer communications to the IEEE 802.2, IEEE 802.3 Standard Service Specification of the LAN model 504. The OSI "Data Link" layer 506 corresponds to: at the Network layer side 505, to the IEEE LAN model LLC, or Logical Link Control sublayer 506; and below the LLC sublayer the MAC, or Media Access Control sublayer 508. The OSI Physical layer 510 includes the following sublayers and interfaces of the IEEE 802.3 LAN model 504, starting at the sublayer adjacent to MAC sublayer 508: (1) the Reconciliation sublayer 512; (2) the Medium Independent Interface or MII interface 514; (3) the PHY or Physical Layer Device 516. The PHY or Physical Layer Device 516 has different sublayers, depending upon the medium to which the device is attached, as illustrated in FIG. 5 for 10 Mb/s and 100 Mb/s media. However the sublayers of PHY 516 are not further discussed herein, and reference to the IEEE 802.3u Standard for any necessary information is herein made.

The MII interface 514, as an example, may be used for the standard interface discussed hereinabove with reference to the standard interface of semiconductor device 100 illustrated in FIG. 1, and the standard interface illustrated hereinabove in FIG. 2A and FIG. 2B. FIG. 5 illustrates the ordinary and standard use of the MII interface 514 as a medium independent standard interface for transfer of signals between a MAC sublayer 508 device and a physical layer device PHY device 516.

PHY 516 is illustrated as a 10 megabit per second, or 10 Mb/s, physical device 518 driving a 10 megabit per second Ethernet local area network (local area network not shown). Medium 519 is a transmission medium designed for a 10 megabit per second ethernet.

Also, PHY 516 is illustrated as a 100 megabit per second physical device 520 driving a 100 megabit per second, 100 Mb/s, Ethernet (local area network not shown). Medium 522 is a transmission medium designed for a 100 megabit per second Ethernet.

Figure 6:
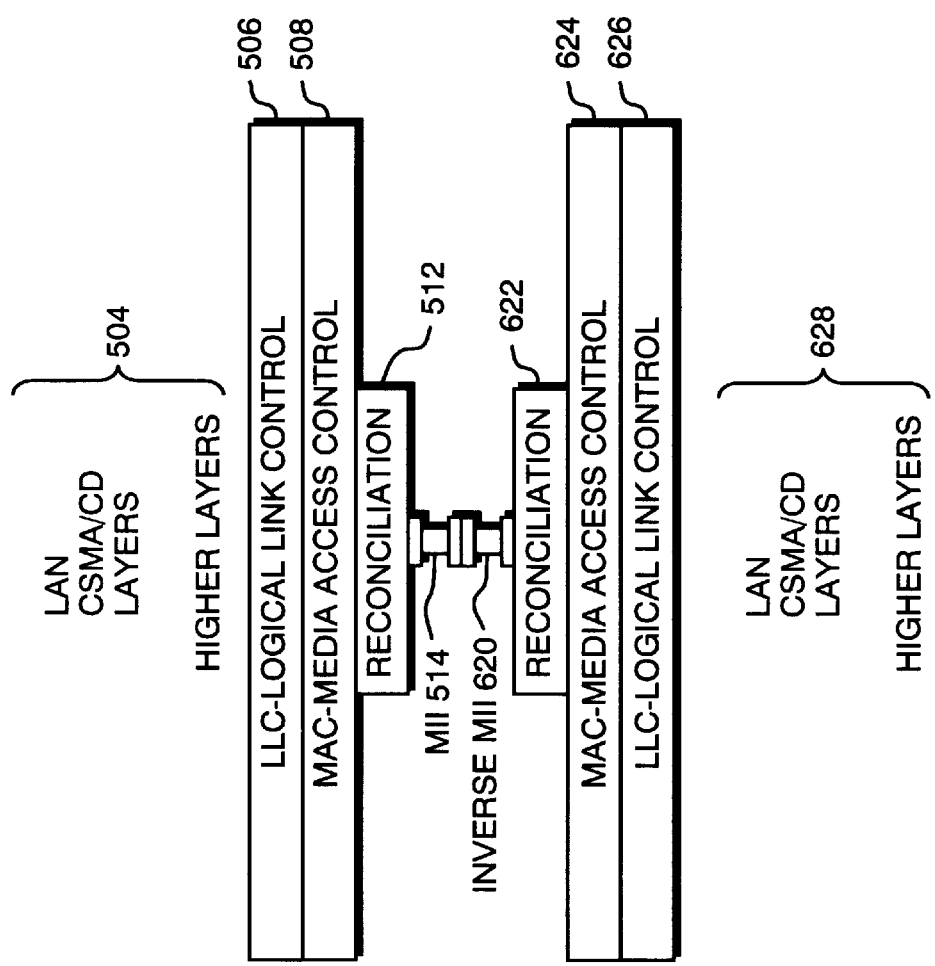
FIG. 6 is a block diagram of an inverse mode MII interface communicating with a standard MII interface.

Turning now to FIG. 6, there is illustrated the use of an inverse mode MII interface 620.

Inverse mode MII interface 620 couples a standard MII interface 514, through a Reconciliation sublayer 622, to a second MAC sublayer device 624. The second MAC sublayer device 624 may then couple to a LLC, Logical Link Control sublayer 626, and the LLC 626 then couples to higher layers 628 in the IEEE 802.3 Standard Service Specifications. As illustrated in FIG. 1, FIG. 2A and FIG. 2B, a single semiconductor device 100 may be made to function as either the standard MII interface 514, or the inverse mode MII interface 620 by the selection of the voltage to which mode selection pin 122 is driven, as illustrated in FIG. 3 and FIG. 4.

Figure 6A:
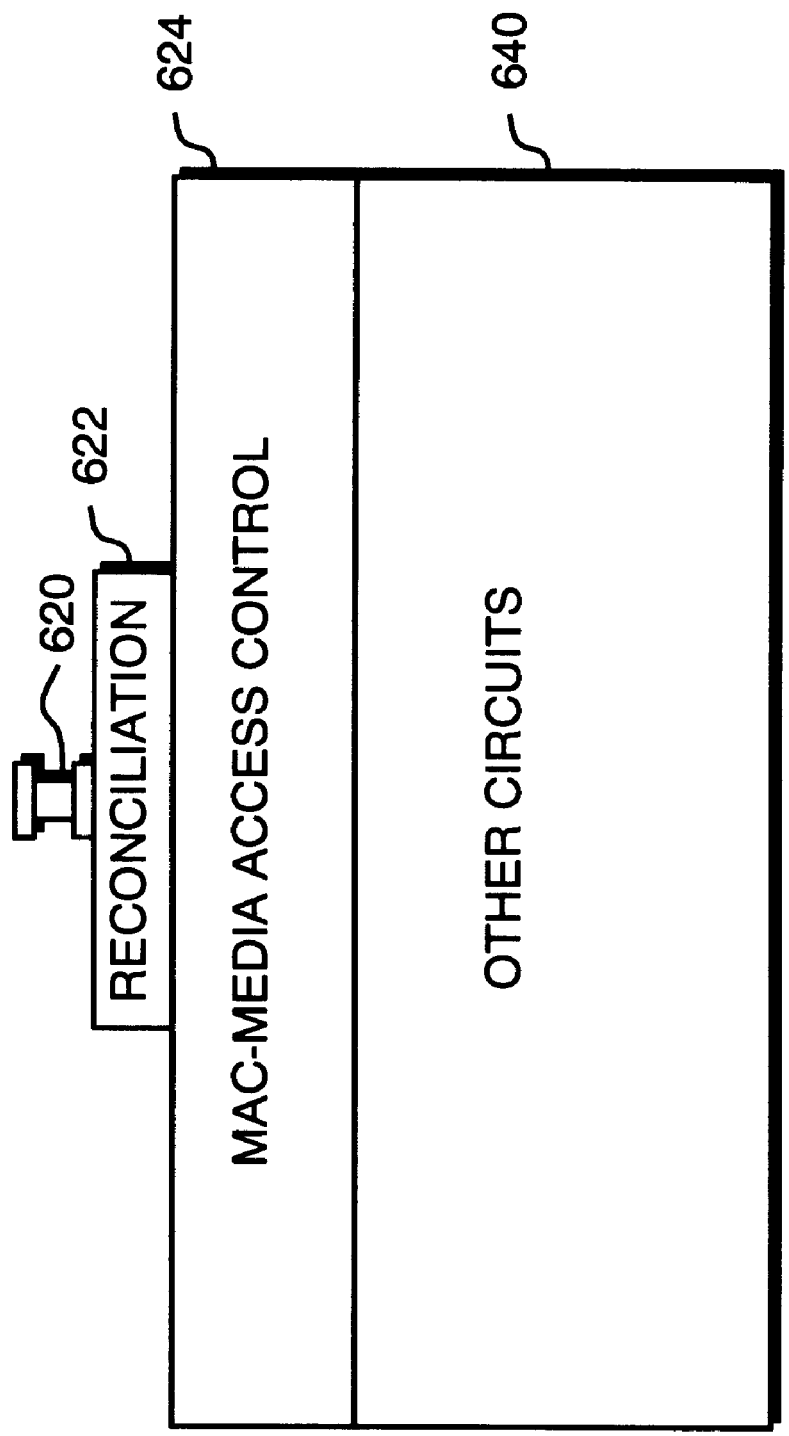
FIG. 6A is a block diagram of an alternative embodiment of an inverse mode MII interface.

Turning now to FIG. 6A, there is shown an alternative embodiment of the invention where the inverse MII interface 620 couples through a Reconciliation sublayer 622 to a MAC device 624. However, alternatively, the MAC device 624 couples to other circuits, represented as block 640. The nature of the other circuits in block 640 depends upon the nature of the semiconductor device 100 into which the interface is embedded. In an exemplary embodiment of the invention, shown in FIG. 6, the other circuits block 640 is a LLC layer 626 coupled to higher IEEE 802.3 type communication layers. In a further exemplary embodiment of the invention the other circuits block 640 may couple directly to a switching core, may couple directly to bus driver hardware, or alternatively, may couple to any convenient computer circuits.

Figure 7:
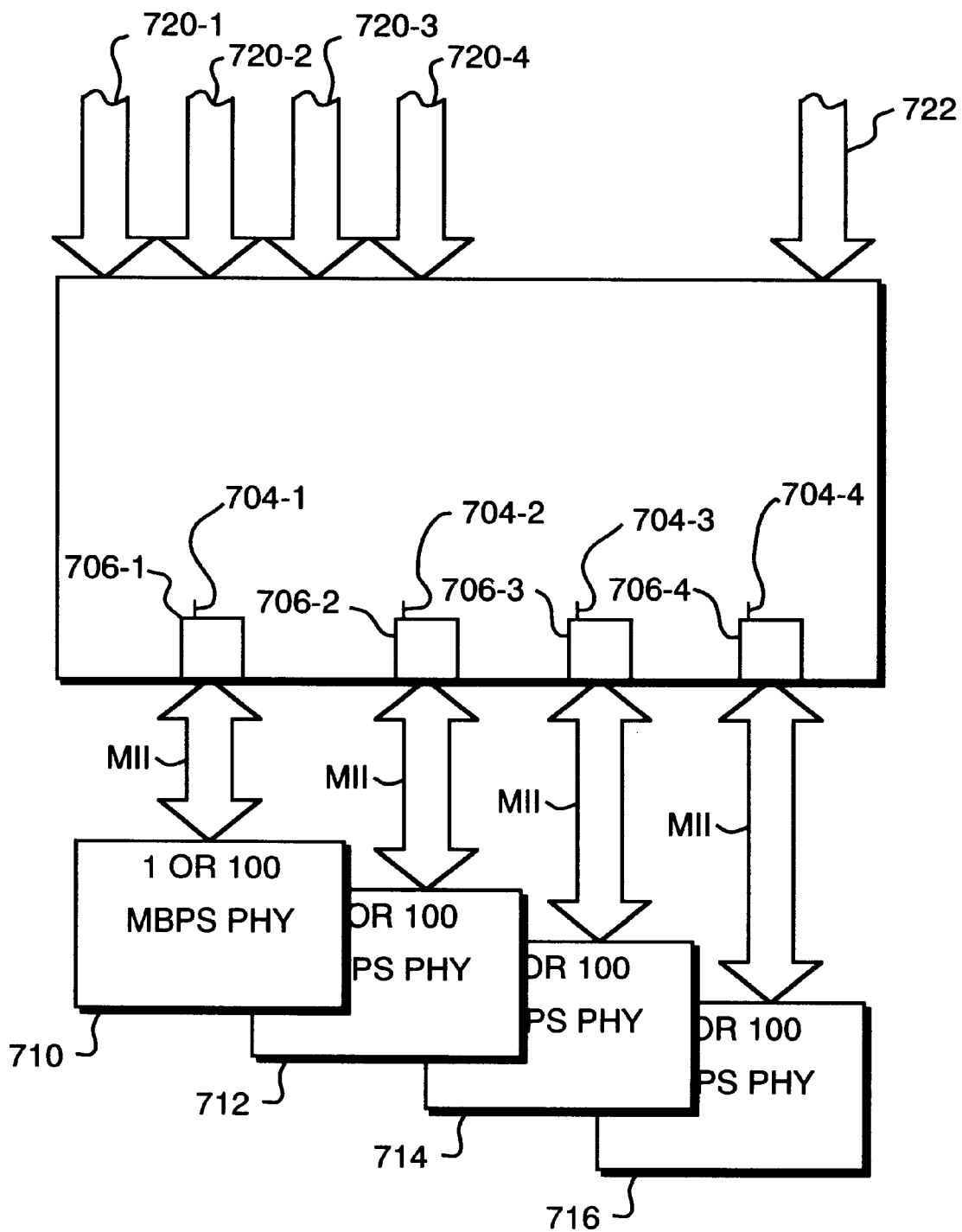
FIG. 7 is a block diagram of a dual mode interface semiconductor device having multiple standard interfaces in a standard interface mode.

Turning now to FIG. 7, there is illustrated a semiconductor device 702. A semiconductor device such as semiconductor device 702 is often conveniently referred to as a computer chip or a network chip. Semiconductor device 702 has four (4) dual mode interfaces, 704-1, 704-2, 704-3, and 7044. Dual mode interface 704-1 has mode select pin 706-1; dual mode interface 704-2 has mode select pin 706-2; dual mode interface 704-3 has mode select pin 706-3; and, dual mode interface 704-4 has mode select pin 706-4. In the illustrative embodiment of FIG. 7, each of the mode select pins 706-1, 706-2, 706-3, and 706-4 are driven to make their corresponding dual mode interfaces function as a standard MII interface, as illustrated in FIG. 2A.

Dual mode interface 704-1 is coupled to a PHY device 710, and PHY device 710 may be an Ethernet local area network, and may operate at either 10 megabits per second or may operate at 100 megabits per second, or may operate at some other convenient bit rate such as at 1,000 megabits per second. Dual mode interface 704-2 is coupled to a PHY device 712. Dual mode interface 704-3 is coupled to PHY device 714. Dual mode interface 704-4 is coupled to PHY device 716. The PHY devices 710, 712, 714, and 716 are, for illustration, Ethernet devices which can operate at a convenient bit rate, such as: 10 megabits per second, 100 megabits per second, or at some other convenient bit rate such as at 1,000 megabits per second.

Semiconductor device 702 is also illustrated as having bus path connections 720-1, 7202, 720-3, and 720-4. For example, dual mode interface 704-1 may connect to bus path 720-1; dual mode interface 704-2 may connect to bus path 720-2; dual mode interface 704-3 may connect to bus path 720-3, and dual mode interface 704-4 may connect to bus path 720-4. Bus path 722 is illustrative of a plurality of control signals brought to semiconductor device 702. Control lines within control bus path 722 can control many functions of semiconductor device 702, including which bus path a particular dual mode interface may connect to.

Figure 8:
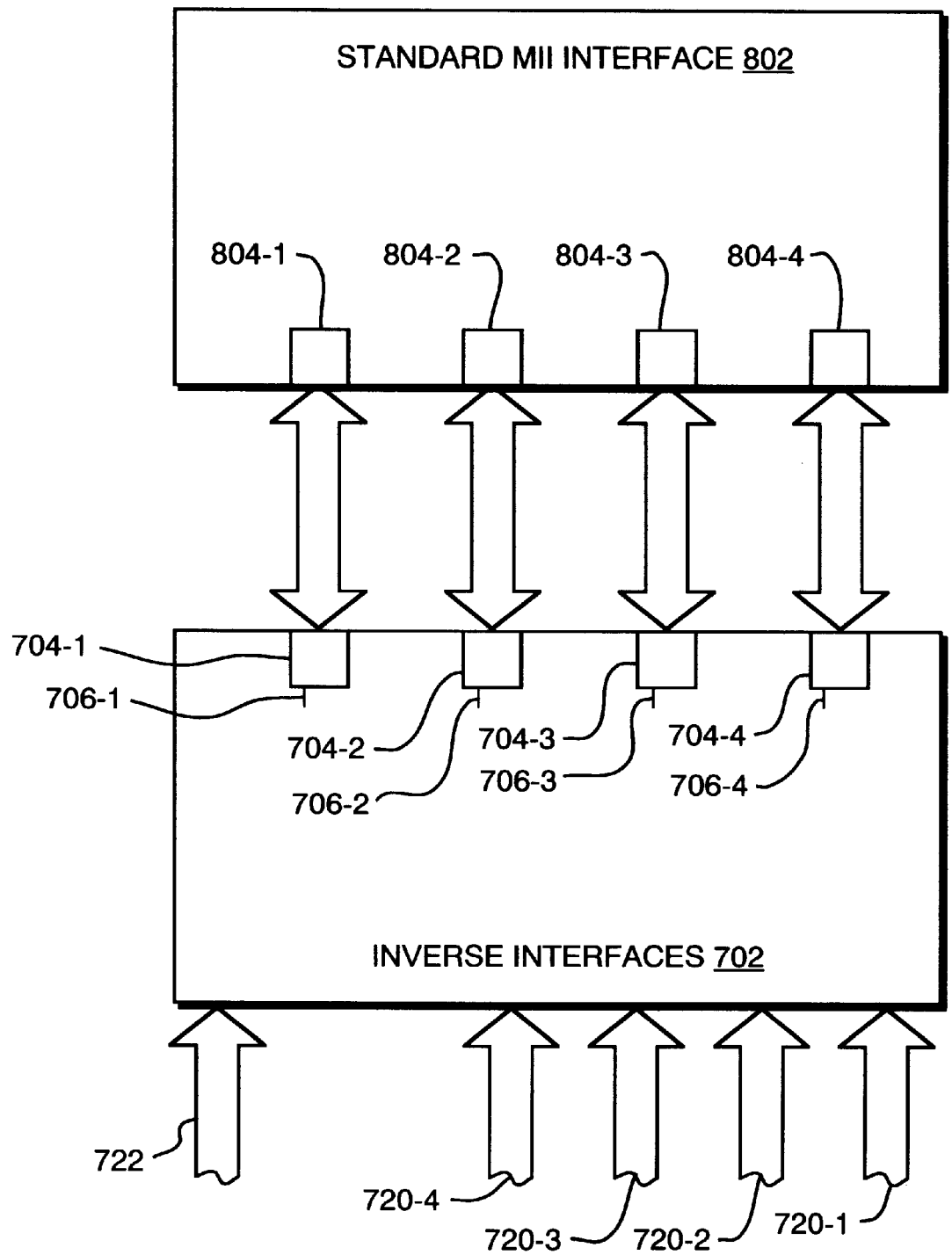
FIG. 8 is a block diagram of a dual mode interface semiconductor device having multiple inverse mode interfaces.

Turning now to FIG. 8, there is illustrated semiconductor device 702, but with mode pins 706-1, 706-2, 706-3, and 706-4 all driven to place their corresponding dual mode interfaces 7041, 704-2, 704-3, and 704-4 into inverse mode. Dual mode interfaces 704-1, 704-2, 704-3, and 704-4 are in inverse mode, and are therefore configured as illustrated in FIG. 2B as inverse mode MII interfaces.

Semiconductor device 802 contains four (4) standard MII interfaces, 804-1, 804-2, 804-3, and 804-4. A semiconductor device such as semiconductor device 802 is often conveniently referred to as a computer chip or a network chip. Inverse mode interface 704-1 is coupled to communicate with standard MII interface 804-1. Inverse mode interface 704-2 is coupled to communicate with standard MII interface 804-2. Inverse mode interface 704-3 is coupled to communicate with standard MII interface 804-3. Inverse mode interface 704-4 is coupled to communicate with standard MII interface 804-4. The inverse mode interfaces communicate with the standard MII interfaces as is illustrated hereinabove in FIG. 2B, and in FIG. 6. Semiconductor device 802 may, for illustrative purposes, be four separate semiconductor devices, or for illustrative purposes, may be one semiconductor device having four (4) separate standard MII interfaces formed therein.

Figure 9:
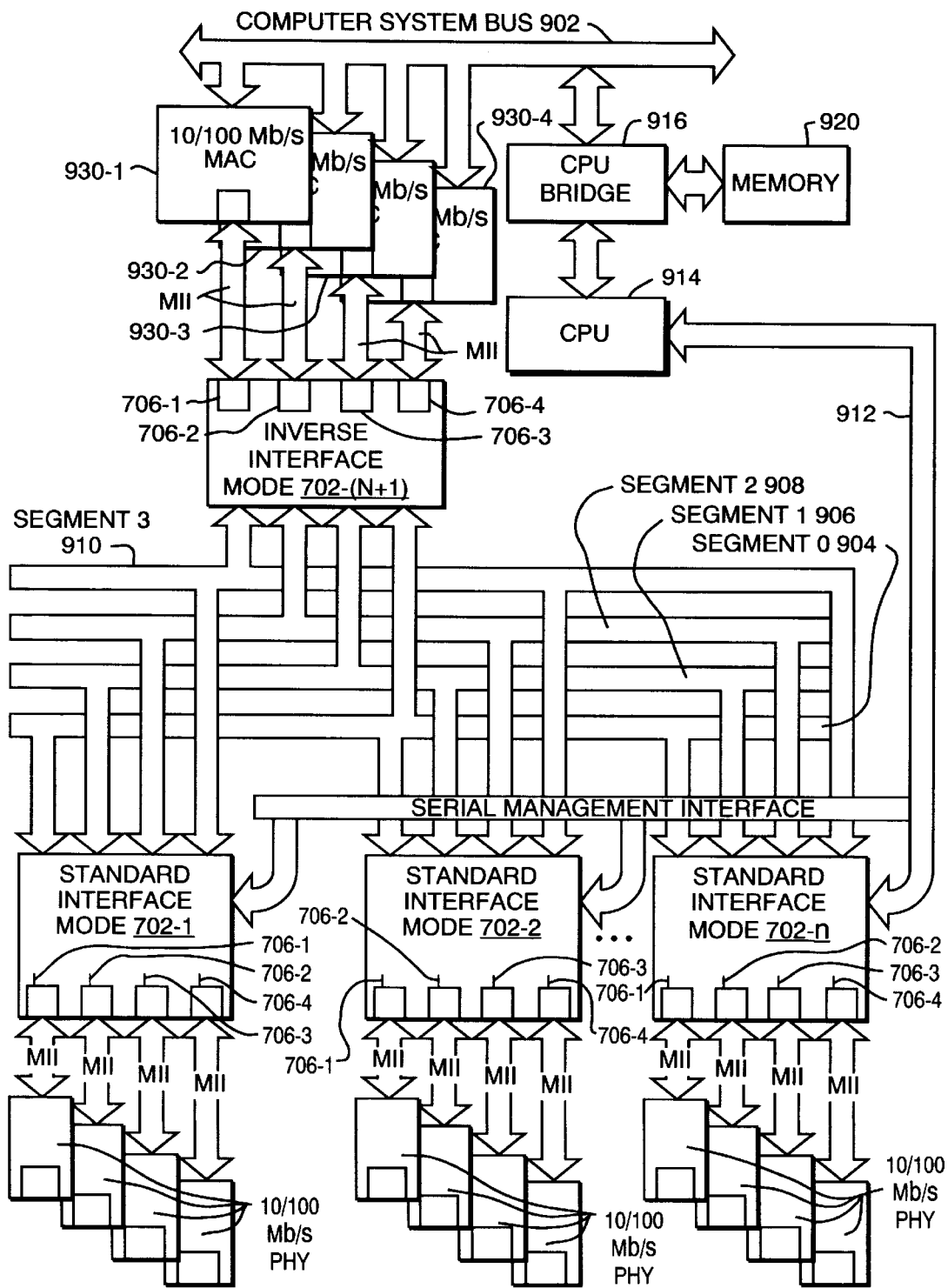
FIG. 9 is a block diagram of a system using a plurality of semiconductor devices, some with an interface in MII mode and some with an interface in an inverse MII mode.

Turning now to FIG. 9, there is illustrated a system using a plurality of semiconductor devices having dual mode interfaces 702, as illustrated in FIG. 7 and FIG. 8. Semiconductor device 702-1 has all four mode select pins 706-1, 706-2, 706-3, 706-4 driven to select the dual mode interfaces to operate in "standard interface" mode. Also the other semiconductor devices 702-2, through 702-N, have their mode select pins driven to set the dual mode interfaces to "standard interface" mode. Each of the dual mode interfaces are then in "standard interface" mode, and accordingly are coupled to PHY devices as illustrated in FIG. 7. Each of the PHY devices may, for example, drive an Ethernet local area network. The Ethernet local area networks may operate at any convenient standard bits per second rate, as for example 10 megabits per second, 100 megabits per second, or 1,000 megabits per second.

In contrast, semiconductor device 702-(N+1) has its mode select pins 706-1, 706-2. 7063, 706-4 driven to place the dual mode interfaces in inverse mode. In the exemplary embodiment illustrated in FIG. 9, each of the inverse mode interfaces 706-1, 706-2, 706-3, and 706-4 drive a device having a MAC sublayer device with a MII standard interface, and the MAC sublayer device then couples to a hardware driver to communicate data onto a computer system bus 902.

Semiconductor devices 702-1, 702-2, through 702-N communicate through segment bus 904, segment bus 906, segment bus 908, and segment bus 910. Management bus 912 communicates from Central Processor Unit (CPU) 914 to each of the semiconductor devices 702-1, 702-2, 702-3, and 702-4 for the transfer of management information. CPU bridge 916 couples CPU 914 with memory unit 920 and computer system bus 902.

Semiconductor device 702-(N+1) also couples to the segment buses 904, 906, 908, and 910, and couples these segment buses to the MAC sublayer of the computer bus drivers 930-1, 930-2, 930-3, and 930-4. Semiconductor devices such as semiconductor devices 930-1 . . . 930-4 are often conveniently referred to as computer chips or network chips.

By operating with its dual mode interfaces in the inverse mode, semiconductor device 702-(N+1) communicates directly with MII standard interfaces built into the MAC sublayer devices of computer bus drivers 930-1, 930-2, 930-3, and 930-4. A dual mode interface operating in the inverse mode communicating with a standard MII interface is illustrated hereinabove in a plurality of figures, including FIG. 1, FIG. 2B, FIG. 6, and FIG. 8 and the text herein relating to these figures.

The system illustrated in FIG. 9 may, for example, filter management type data packets from the segment buses 904, 906, 908, and 910, and forward them along the computer system bus 902 to the CPU 914 for the purpose of CPU 914 delivering management commands to the various semiconductor devices through management bus 912. As a further illustration, the computer system bus 902 may be used to forward data packets from one segment bus to another segment bus in order for the system to function as a router transferring data packets between Ethernet local area networks connected to the PHY devices which are connected to the semiconductor devices 702-1, 702-2, through 702-N, although this function will be bandwidth limited by the bandwidth of the computer system bus 902.

Figure 10:
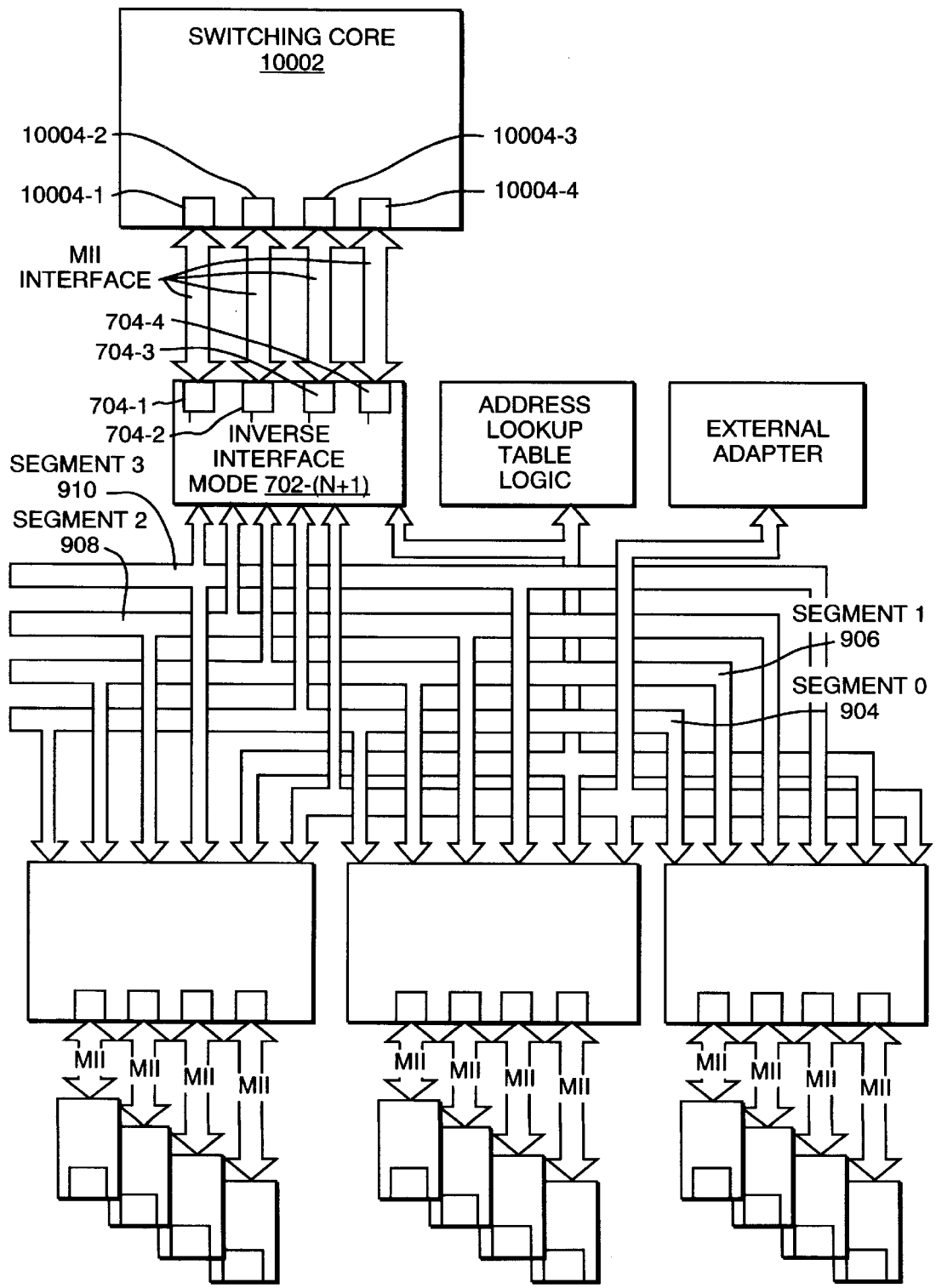
FIG. 10 is a block diagram of a second system using a plurality of semiconductor devices, some with an interface in MII mode and some with an interface in an inverse MII mode.

Turning now to FIG. 10, there is illustrated a switching core 10,002 coupled to the segment buses 904, 906, 908, and 910. A semiconductor device such as semiconductor device 10,002 is often conveniently referred to as a computer chip or a network chip. For example, 15 switching core 10,002 may be a high bandwidth switching device, and so, for purpose of illustration transfer data packets between segment buses 904, 906, 908, 910 at segment bus speed. Inverse mode interface 704-1 communicates with standard interface 10,001. Inverse mode interface 704-2 communicates with standard interface 10,004-2. Inverse mode interface 704-3 communicates with standard interface 10,004-3. And, inverse mode interface 704-4 communicates with standard interface 10,004-4.

An advantage of the present invention is that a single dual mode interface semiconductor device 702, as illustrated in FIG. 7 and FIG. 8, may be used to both connect segment buses 904, 906, 908, and 910 to either PHY devices and then to local area networks, and also connect the segment buses to MAC sublayer devices having a standard MII interface such as the computer system bus drivers illustrated in FIG. 9, and the switching core illustrated in FIG. 10.

It is to be understood that a system may have all of the features illustrated in both FIG. 9 and FIG. 10, so that a system may transfer data packets between the segment buses by a switching core, and may also filter management packets and transfer them over a computer system bus to a CPU for generation of management signals on a management bus. The use of the inventive semiconductor device 702 which has dual mode interfaces, operating in standard interface mode or operating in inverse mode, depending upon the voltage to which a mode pin is driven, greatly simplifies the design of inter-connection of complex systems.

It is to be understood that the above described embodiments are simply illustrative of the principles of the invention. Various other modifications and changes may be made by those skilled in the art which will embody the principles of the invention and fall within the spirit and scope thereof.

What is claimed is:

1. A digital semiconductor device, comprising:

an interface, said interface capable of transferring data from a MAC device to a PHY device and capable of transferring data from said PHY device to said MAC device;

means for setting said interface in a first mode or a second mode, and when said interface is in said first mode said interface is capable of transferring signals between said MAC device and said PHY device, and when said interface is in said second mode said interface is capable of transferring signals between a first MAC device and a second MAC device; and, means for connecting a computer chip having a MAC device to said digital semiconductor device operating in said second mode, said interface transferring signals between said MAC device in said computer chip and a second MAC device in said digital semiconductor device.

2. A digital semiconductor device, comprising:

an interface, said interface capable of transferring data from a MAC device to a PHY device and capable of transferring data from said PHY device to said MAC device;

means for setting said interface in a first mode or a second mode, and when said interface is in said first mode said interface is capable of transferring signals between said MAC device and said PHY device, and when said interface is in said second mode said interface is capable of transferring signals between a first MAC device and a second MAC device; and, means for connecting a network chip having a MAC device to said digital semiconductor device operating in said second mode, said interface transferring signals between said MAC device in said network chip and a second MAC device in said digital semiconductor device.

3. The device as in claim 1 or claim 2 wherein said interface conforms with an IEEE standard 802.3u Media Independent Interface (MII) standard.

4. A system, comprising:

a computer chip having at least one MAC device as an input/output device: and a digital semiconductor device comprising:

at least one interface said interface capable of transferring data from a MAC device to a PHY device and capable of transferring data from said PHY device to said MAC device;

means for setting said at least one interface in a first mode or a second mode, and when said at least one interface is in said first mode said at least one interface is capable of transferring signals between said MAC device and said PHY device, and when said at least one interface is in said second mode said at least one interface is capable of transferring signals between a first MAC device and a second MAC device; and means for connecting said computer chip to said digital semiconductor device operating in said second mode, said interface transferring signals between said MAC device in said computer chip and a MAC device in said digital semiconductor device.

5. The system as in claim 4 wherein said computer chip further comprises: a connection to a computer system bus.

6. The system as in claim 4 wherein said computer chip further comprises: a switching core.

7. The apparatus as in claim 1 or claim 4 wherein said means for setting said interface in a first mode or a second mode, comprises:

a pin of said digital semiconductor device, said pin connected to a first voltage to signal operation in said first mode, and said pin connected to a second voltage to signal operation in said second mode.

8. The apparatus as in claim 7 wherein said means for setting said interface in a first mode or a second mode further comprises:

a sampling circuit, said sampling circuit to sample a voltage applied to said pin during initialization of said semiconductor device;

means, responsive to a value of said voltage sampled, for driving a logic signal line; and, means for said logic signal line to drive said digital semiconductor device into operation in said first mode or in said second mode in response to said value of said voltage sampled.

9. The apparatus as in claim 8 wherein said sampling circuit comprises a latch.

10. The apparatus as in claim 8 wherein said pin supplies a selected function during steady operation of said semiconductor device.

11. The apparatus as in claim 10 wherein said selected function further comprises: driving a light emitting diode.

12. A system, comprising:

a network chip having at least one MAC device as an input/output device; and a digital semiconductor device comprising, at least one interface, said at least one interface capable of transferring data from a MAC device to a PHY device and capable of transferring data from said PHY device to said MAC device;

means for setting said at least one interface in a first mode or a second mode, and when said at least one interface is in said first mode said at least one interface is capable of transferring signals between said MAC device and said PHY device, and when said at least one interface is in said second mode said at least one interface is capable of transferring signals between a first MAC device and a second MAC device; and, means for connecting said network chip to said digital semiconductor device operating in said second mode, said at least one interface transferring signals between said MAC device in said network chip and a second MAC device in said digital semiconductor device.

13. A method for interconnecting digital semiconductor devices, said digital semiconductor devices each having an interface, each said interface capable of transferring data from a MAC device to a PHY device and capable of transferring data from said PHY device to said MAC device, said method comprising the steps of:

setting said interface in a selected digital semiconductor device in a first mode or a second mode, and when said interface is in said first mode said interface is capable of transferring signals between said MAC device and said PHY device, and when said interface is in said second mode said interface is capable of transferring signals between a first MAC device and a second MAC device; and, connecting a second digital semiconductor device having a MAC device to said selected digital semiconductor device operating in said second mode, said interface transferring signals between said MAC device in said selected digital semiconductor device and said MAC device in said second digital semiconductor device.

14. The method of claim 13, further comprising the step of:

operating said interface according to the specifications of a MII interface as defined in IEEE standard 810.3u.

15. The method of claim 13, further comprising the step of:

selecting said second digital semiconductor device as a switching core.

16. The method of claim 13, further comprising the step of:

selecting said second digital semiconductor device as a bus interconnect.

17. The method of claim 13, further comprising the steps of:

launching a control signal line to a logic level in response to a voltage detected on a pin of said selected digital semiconductor device; and operating logic elements within said selected digital semiconductor device in response to said logic level of said signal line to operate said selected digital semiconductor device in said second mode.

18. The method of claim 17, further comprising the step of:

changing usage of selected pins of said selected digital semiconductor device in response to said logic level of said control signal line by at least one multiplexer, said multiplexer responsive to said logic level.

* * * * *